INVENTOR.
Azor D. Robbins

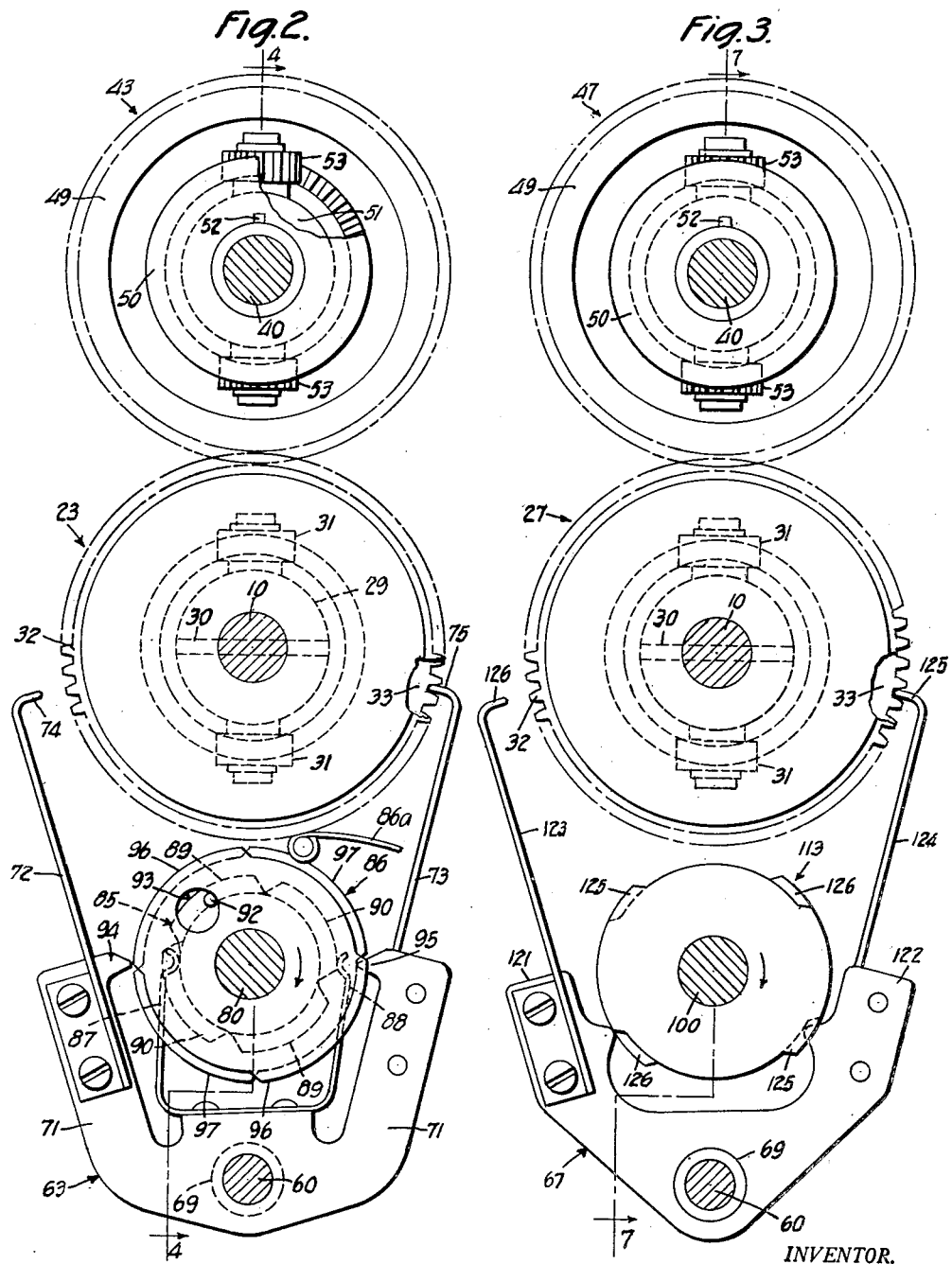

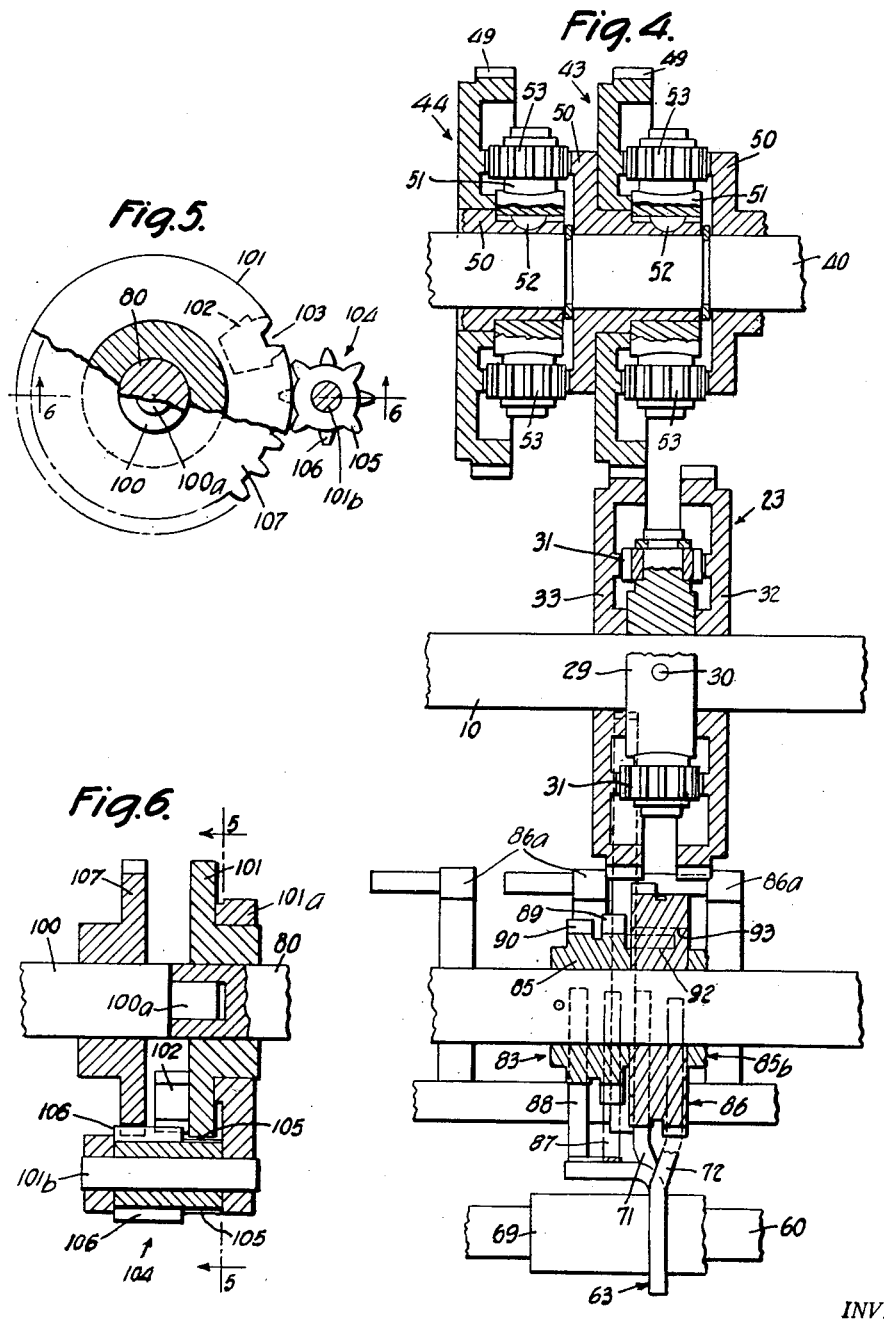

Nov. 27, 1956  A. D. ROBBINS  2,771,793
MULTIPLE SPEED TRANSMISSION MECHANISM
Filed July 10, 1953                4 Sheets-Sheet 4
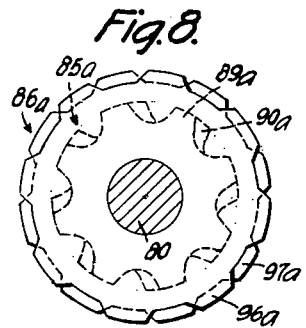
Fig. 8.
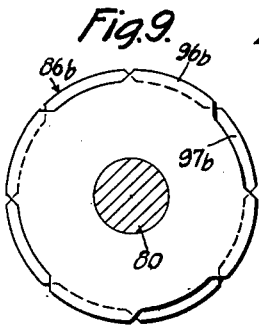
Fig. 9.
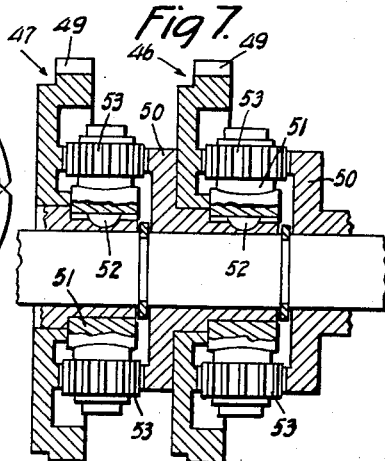
Fig. 7.
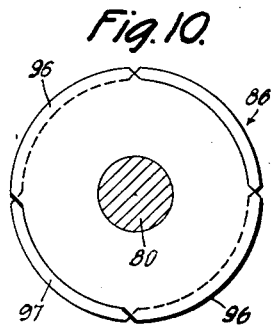
Fig. 10.
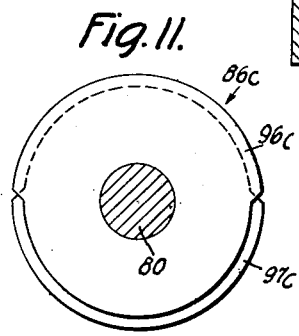
Fig. 11.
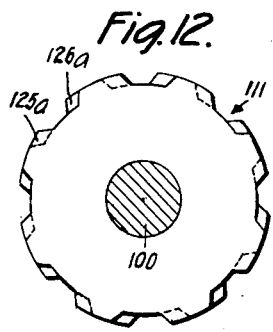
Fig. 12.
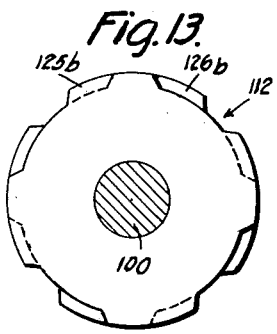
Fig. 13.
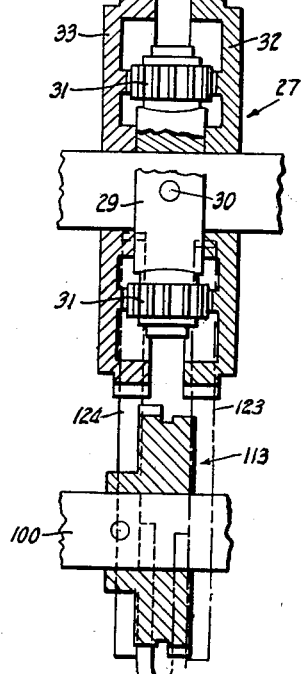
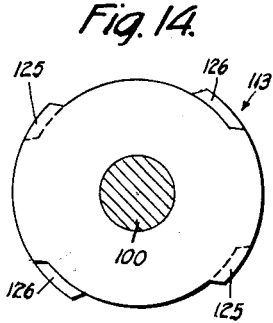
Fig. 14.
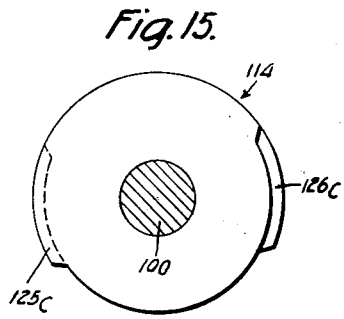
Fig. 15.
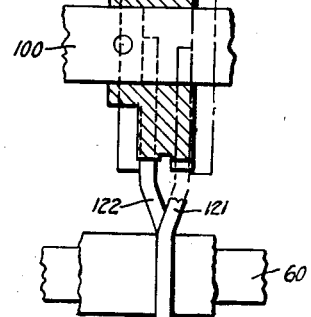
INVENTOR.
Azor D. Robbins
BY
Moss, Nolte, Crewe & Berry
ATTORNEYS United States Patent Office 2,771,793
Patented Nov. 27, 1956

2,771,793

MULTIPLE SPEED TRANSMISSION MECHANISM

Azor D. Robbins, Hempstead, N. Y., assignor to The W. L. Maxson Corporation, New York, N. Y., a corporation of New York Application July 10, 1953, Serial No. 367,201

7 Claims. (Cl. 74—753)

This invention relates broadly to multiple speed transmission mechanism and more particularly to mechanism adapted to provide a very large number of transmission ratios. An apparatus of the kind referred to may, for example, comprise an input member adapted for progressive operation to any desired extent, an output member operable from the input member, a multiple speed transmission means, and a transmission ratio selector for establishing any one of a multiplicity of variable driving ratios from the input member to the output member. As thus broadly stated, the invention utilizes the principle of the mechanism disclosed in United States Patent No. 2,177,611 and constitutes an improvement upon the mechanism disclosed in that patent.

A typical application of the invention might occur in the familiar gasoline station computing pump. The ratio selector sets up the transmission ratio from the input member to the output member, this ratio being the multiplicand, and corresponding to the price per gallon. The input member is operated by the flowing gasoline and in proportion to the volume delivered. It represents the number of gallons and is the multiplier. The output member is operated from the input member in proportion to the product of the multiplicand by the multiplier, so that the extent of output operation corresponds to the sale price. Each of these items, the multiplicand, the multiplier, and the product may be indicated on a separate counter in accordance with familiar practice. For illustrative purposes, the present invention will be disclosed by reference to a computing operation of the kind preferred to.

The primary object of the invention is to provide novel ratio selector mechanism which, in the lower denominations, at least, exerts a snap action to effect a switchover of operating connections instantaneously.

The mechanism upon which the ratio selector acts in each denomination is a differential gear which includes an input planet gear carrier, and parallel transmitting and waste gears which are adapted, through circumferential teeth to be alternatively locked and unlocked.

It is a feature of the invention that the ratio selector comprises a cam shaft, and for each of several lower denominations, a first cam fast on the cam shaft, a second cam loose on the cam shaft, means forming a lost motion driving connection from the first to the second of said cams, a U-shaped cam follower, means rockably supporting the cam follower, opposed spring arms carried by the follower, and engageable with the fixed cam at opposite sides of the cam shaft, projections on the follower engageable with the loose cam at opposite sides of the cam shaft, and hooks carried by the follower for engagement respectively with the circumferential teeth of the transmission and waste gears of the associated input differential, and movable alternatively toward and from gear engagement, the construction and arrangement in each instance being such that the spring arms, responsive to the cam which is fixed on the cam shaft, are first put under follower shifting bias by the fixed cam and the lagging, loose cam, in engagement with the follower arm projections, and is then carried on into position to permit such bias to take effect, shifting the follower by snap action out of engagement with one gear of the associated differential and into engagement with the other, the timing of the shift being controlled by the loose cam.

In the drawing, forming part of this specification

Figure 2 is a longitudinal, vertical, sectional view on a larger scale than Figure 1, and taken upon the line 2—2 of Figure 1, looking in the direction of the arrows;

Figure 3 is a longitudinal, vertical, sectional view on a larger scale than Figure 1, and taken upon the line 3—3 of Figure 1, looking in the direction of the arrows;

Figure 4 is a fragmentary, transverse, vertical, sectional view taken upon the line 4—4 of Figure 2, looking in the direction of the arrows, with some parts broken away and others omitted to avoid useless duplication of showing;

Figure 5 is a detail view in sectional elevation, the section being taken on the line 5—5 of Figures 1 and 6, looking in the direction of the arrows;

Figure 6 is a bottom plan view, partly in section, of the structure illustrated in Figure 5, the section plane being indicated at 6—6 in Figure 5;

Figure 7 is a fragmentary, transverse, vertical, sectional view taken upon the line 7—7 of Figure 3, looking in the direction of the arrows;

Figures 8 to 11 are views in elevation showing control cams employed, respectively, in connection with the first to fourth denominations of the ratio selector or multiplicand setting means, in conjunction with a first group of four input differentials of the lower denominations;

Figures 12 to 15 are views in elevation showing control cams employed, respectively, in connection with the fifth to eighth denomination of the ratio selector or multiplicand setting means.

Figure 1:
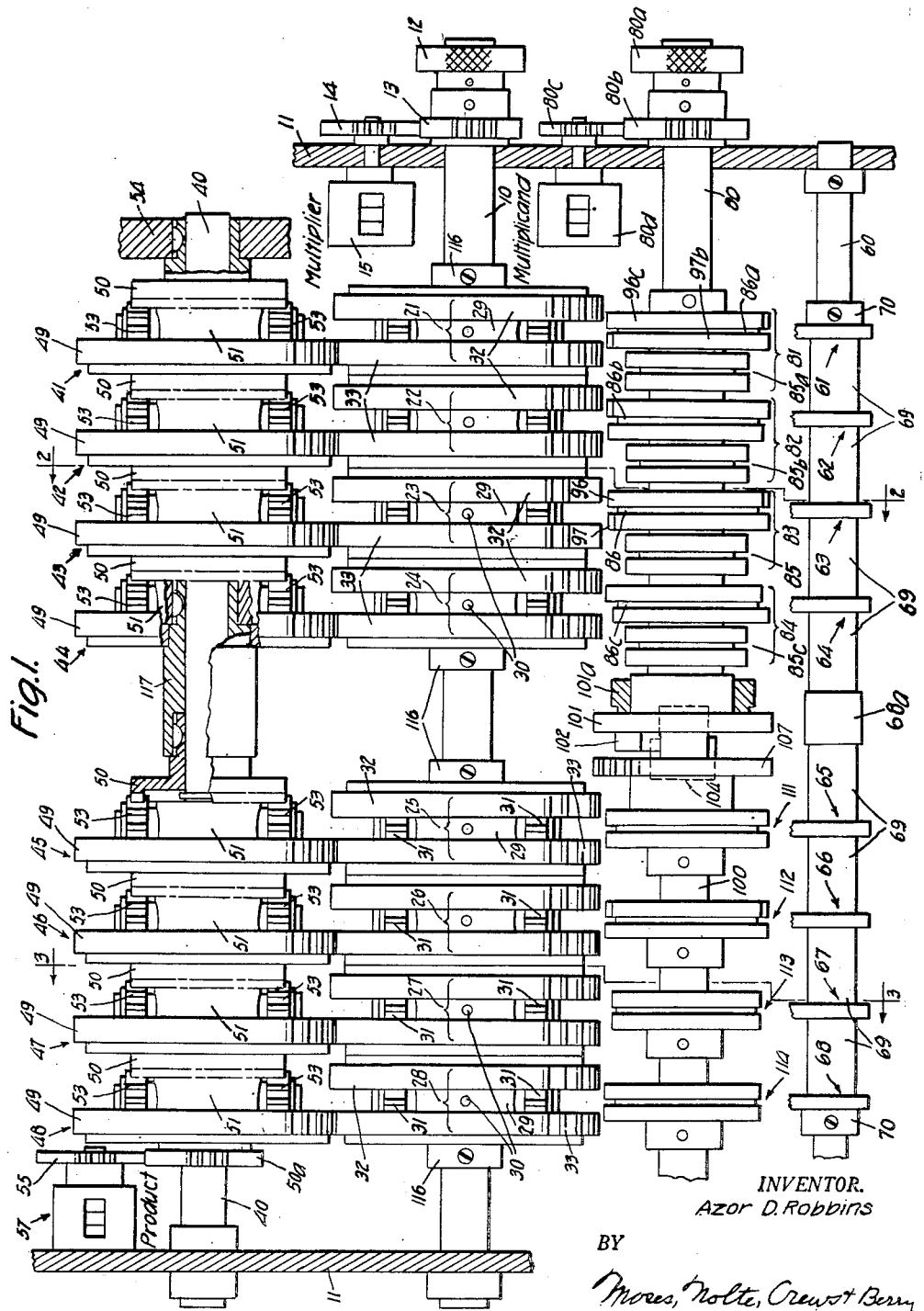
Figure 1 is a fragmentary, comprehensive front view, omitting some surface details, of an illustrative multiplying apparatus which embodies the invention.

The illustrative machine comprises a multiplier input shaft 10 which is mounted in a plurality of frame members 11. The shaft 10 has affixed to it an operating knob 12. The shaft 10 is connected through gears 13 and 14 to drive the input shaft of a decimal counter 15 for indicating the amount of a commodity sold; for example, gasoline in gallons and tenths of gallons.

The shaft 10 has mounted upon it eight identical input differential gears 21, 22, 23, 24, 25, 26, 27 and 28. The differential gear 23 is shown in Figure 4 and the differential gear 27 is shown in Figure 7. Since these differential gears are all alike a description of one will suffice for all. The differential gear 23 comprises a planet gear carrier 29 affixed to the shaft 10 by a pin 30. The carrier 29 rotatably supports transverse planetary pinions 31 which mesh with equal side gears 32 and 33, the latter gears being freely mounted on the shaft 10. The gears 32 and 33, besides having crown teeth which mesh with the pinions 31, have circumferentially arranged or spur teeth.

The carrier 29, being affixed to the shaft 10, travels in unison with the shaft 10. The side gears 32 and 33 are driven by the carriers. It is characteristic of a differential gear constructed as described that the carrier will always travel at a speed equal to one-half the algebraic sum of the rotary speeds of the side gears 32 and 33. In the present machine the gears 32 and 33 of a given differential are never allowed to be turned simultaneously, the ratio selector being constructed and arranged to lock these gears alternatively. Whichever one of the gears 32 and 33 is unlocked at any given time will therefor travel in the same direction as the associated carrier 29 at twice the rotary speed of the carrier.

The gear 32 is a waste gear which meshes with nothing. Its peripheral teeth serve merely as a means for locking it against rotation or releasing it as desired. The peripheral teeth of the gear 33 serves the same purpose, but also serve, when the gear is rotated, to transmit input rotation to one of a series of eight summing differential gears mounted on a shaft 40.

Before proceeding with the further description, the point should be noted that the differential gears 21 to 28 constitute independent transmission elements, constantly connected in parallel to the input shaft 10, and capable of being individually rendered active or inactive. All of the gears 21 to 28 may be rendered simultaneously active or simultaneously inactive, or any selected part of the gears of this series may be rendered active. Whether a given differential gear is active or inactive depends upon whether the waste gear 32 is locked so that the input received is transmitted usefully to the transmitting gear 33, or the transmitting gear 33 is locked so that the input received is transmitted uselessly to the waste gear 32.

The gear 33 of each differential gear 21 to 28 is connected to feed directly into one of a series of eight denomination differential gears 41 to 48. The differential gears 41 to 48 are so related to one another that every one of them, except the one of lowest denomination, may also receive input from the differential gear of this same series next lower in denomination to itself.

In Figure 4 the differential gear 43 is shown. The other differential gears mounted on the shaft 40 are duplicates of the differential gear 43 except that there are minor exceptions, which will be noted, in the cases of the first, the fourth, and the last, i. e., 41, 44 and 48. As will be seen in Figure 4, the differential gear 43 comprises a side gear 49 which is a duplicate of either of the gears 32, 33. It also comprises a second side gear 50 whose hub extends into the planet gear carrier 51 of the differential gear 42 and is driven from said carrier by a key 52. Thus two inputs are available to the differential 43, through its side gears 49 and 50. The crown teeth of the gears 49 and 50 form equal gears which mesh with planet gears 53 on the carrier 51.

It has been mentioned that the differential gear 41, which is the gear of lowest denomination of the series 41—48, differs from the other gears of the series. The difference resides in the fact that whereas each of the gears 42—48 may be driven through either or both of its side gears 49, 50, the differential gear 41 can only be driven through its side gear 49 from the shaft 10 through the gear 33 of differential 21, and not through its side gear 50 from a differential gear of still lower denomination. As a matter of fact, the side gear 50 of the differential gear 41 is permanently held against rotation, being keyed to a frame member 54.

Assuming that the gear 32 of differential 21 is locked, so that the gear 33 is active, a single turn of shaft 10 will produce two turns of the gear 33 of the differential 21, and hence two turns of the gear 49 of the differential 41. This, in turn, will produce one turn of the planet carrier 51 of the differential 41. This single turn of the planet carrier 51 of differential 41 becomes one turn of the side gear 50 of the differential gear 42, one-half turn of the side gear 50 of the differential gear 43, one-quarter turn of the side gear 50 of the differential gear 44, one-eighth turn of the side gear 50 of the differential gear 45, one-sixteenth turn of the side gear 50 of the differential gear 46, one thirty-second turn of the side gear 50 of the differential gear 47, one sixty-fourth turn of the side gear 50 of the differential gear 48, and one one-hundred-twenty-eighth turn of the planet carrier 51 of differential gear 48. Thus a turn of the shaft 10 transmitted to the differential 41 through the input gear 49 thereof produces a full turn of the planet carrier (output member) of that differential gear, but as has just been pointed out, this is cut in half seven times, once for each subsequent differential gear passed through. Similarly, a turn of the shaft 10 transmitted to the differential 42 through the input gear 49 thereof produces a full turn of the planet carrier of differential 42, but this is cut in half six times, once for each subsequent differential gear passed through. Since the input through gear 49 of differential 41 is cut in half seven times and an equal input through gear 49 of differential 42 is cut in half only six times (passing through one less subsequent computing differential gear) it is evident that input through 49 of differential 42 has twice the effect upon the ultimate output member of an equal input through gear 49 of differential 41. By a continuation of the same analysis input through gear 49 of differential 43 has twice the weight of an equal input through gear 49 of differential 42, and so on. It is evident, therefore, that equal inputs through the gears 49 of differential gears 41 to 48, respectively, will have relative weights of 1, 2, 4, 8, 16, 32, 64 and 128 in their effects upon the planet carrier of differential gear 48. Thus, a binary system of input values is established.

The planet gear carrier 51 of differential gear 48 is keyed to drive an output gear 50a. The gear 50a is generally like the gears 50 of the other differentials, but it is provided with peripheral teeth and not with crown teeth. The gear 50a, through a gear 55, drives the input shaft 56 of a product indicating counter 57.

The multiplicand setting means is designed to provide an unbroken arithmetical series of available multiplicants in ascending order from 0 to 255. Since the successive individual inputs through gears 49 of differentials 41 to 48 form a geometrical series in which the constant ratio is two, the rule controlling the order in which the inputs shall be made effective and ineffective can be readily determined and is a simple one. For a multiplicand of zero the gears 49 of all the differentials 41 through 48 should be inactive. For a multiplicand of 1 the gear 49 of differential 41 alone should be active. For a multiplicand of 2 the gear 49 of differential 42 alone should be active. For a multiplicand of 3 the gears 49 of differentials 41 and 42 should be active. For a multiplicand of 4 the gear 49 of differential 43 alone should be active.

The following table constitutes a continuation of this analysis. To be complete the table should run from 0 to 255, but the partial table set forth is thought ample to make the principle clear. The extreme left hand column shows the decimal number from 0 to 21. Each of the other columns shows at the head the differential gear whose direct input weight is indicated, and the indication of weight expressed as a power of 2. Under these latter headings the number 1 means active and 0 means inactive.

| Decimal No. | (48) $2^7$ | (47) $2^6$ | (46) $2^5$ | (45) $2^4$ | (44) $2^3$ | (43) $2^2$ | (42) $2^1$ | (41) $2^0$ |
|---|---|---|---|---|---|---|---|---|
| 0 | 0 | 0 | 0 | 0 | 0 | 0 | 0 | 0 |
| 1 | 0 | 0 | 0 | 0 | 0 | 0 | 0 | 1 |
| 2 | 0 | 0 | 0 | 0 | 0 | 0 | 1 | 0 |
| 3 | 0 | 0 | 0 | 0 | 0 | 0 | 1 | 1 |
| 4 | 0 | 0 | 0 | 0 | 0 | 1 | 0 | 0 |
| 5 | 0 | 0 | 0 | 0 | 0 | 1 | 0 | 1 |
| 6 | 0 | 0 | 0 | 0 | 0 | 1 | 1 | 0 |
| 7 | 0 | 0 | 0 | 0 | 0 | 1 | 1 | 1 |
| 8 | 0 | 0 | 0 | 0 | 1 | 0 | 0 | 0 |
| 9 | 0 | 0 | 0 | 0 | 1 | 0 | 0 | 1 |
| 10 | 0 | 0 | 0 | 0 | 1 | 0 | 1 | 0 |
| 11 | 0 | 0 | 0 | 0 | 1 | 0 | 1 | 1 |
| 12 | 0 | 0 | 0 | 0 | 1 | 1 | 0 | 0 |
| 13 | 0 | 0 | 0 | 0 | 1 | 1 | 0 | 1 |
| 14 | 0 | 0 | 0 | 0 | 1 | 1 | 1 | 0 |
| 15 | 0 | 0 | 0 | 0 | 1 | 1 | 1 | 1 |
| 16 | 0 | 0 | 0 | 1 | 0 | 0 | 0 | 0 |
| 17 | 0 | 0 | 0 | 1 | 0 | 0 | 0 | 1 |
| 18 | 0 | 0 | 0 | 1 | 0 | 0 | 1 | 0 |
| 19 | 0 | 0 | 0 | 1 | 0 | 0 | 1 | 1 |
| 20 | 0 | 0 | 0 | 1 | 0 | 1 | 0 | 0 |
| 21 | 0 | 0 | 0 | 1 | 0 | 1 | 0 | 1 |

The input of lowest denomination through 49 of differential 41, which has an assigned value of 1, must be ineffective at zero, effective at one, ineffective at two, and so on in regular alternation. The next higher input through 49 of differential 42, which has a relative value of two, must be ineffective at zero and one, effective at two and three, ineffective at four and five, and so on. In other words, it must be out for two steps then in for two steps in regular alternation. The input through 49 of differential 43, which has a relative value of four must be out for four steps then in for four steps in regular alternation. The general rule is that the input having a relative value of $2^n$ must be out for $2^n$ steps and in for $2^n$ steps in regular alternation, all as illustrated by the examples given. In effect, what has been illustrated is counting in the binary system.

The ratio selector or multiplicand setter comprises a shaft 60 which extends parallel to the shafts 10 and 40. Upon the shaft 60 individual cam followers 61 to 68 are rockably supported. Each follower has a sleeve or hub portion 69 which surrounds the shaft 60. The hub portions of followers 61, 62, 63 and 64 extend toward the left while the hub portions of followers 65, 66, 67 and 68 extend toward the right. A spacer sleeve 68a is interposed between the hubs of followers 64 and 65. Collars 70 are affixed to the shaft 60 to the right of the follower 61 and to the left of the follower 68 for keeping the followers together and confining them to their assigned positions lengthwise of the shaft. The followers 61 to 64 are of the construction illustrated in Figures 2 and 4, while the followers 65 to 68 are of the construction illustrated in Figures 3 and 7.

Each of the followers 61 to 64 comprises a rigid U-shaped body portion 71 which is unitary with the associated hub 69. Stiff but resilient arms 72 and 73 are secured to the respective arms of the body 71. The arms 72 and 73 are provided with inturned hooks 74 and 75 at their upper ends for alternative engagement with the teeth of the respective gears 32 and 33.

To operate the cam follower a shaft 80 is supported between the arms in parallel relation to the shafts 10, 40 and 60. A multiplicand input knob 80a is made fast on the shaft 80, and the shaft is connected through gears 80b and 80c to operate a multiplicand indicating counter 80d forward or backward.

The shaft 80 carries four cam groups 81 to 84, which are associated respectively with the cam followers 61 to 64 and with the differential gears 21 to 24. Each of the cam groups referred to comprises two cams, those shown in Figures 2 and 4 being designated 85 and 86. Each follower has affixed to it spring arms 87 and 88 for engaging opposite sides of the cam 85. The cam 85 consists of two discs unitary with one another but spaced apart axially of the shaft 80. One of the discs has two high sectors or lobes 89 arranged in alternation with two low sectors, while the other disc has two high sectors or lobes 90 arranged in alternation with two low sectors. Each sector covers substantially a quadrant. The high sectors of one disc coincide substantially in angular disposition with the low sectors of the other. The arms 87 and 88 are offset so that one arm may constantly engage one of the discs composing the cam 85 while the other of the arms may constantly engage the other of said discs. Rotation of cam 85 by the shaft 80 alternately creates pressure on the spring arms 87 and 88. This tends to rock the cam follower 63 in first one direction and then the other so that the hook 75 will first engage the gear 33 for a quarter turn of the shaft 80 and the hook 74 will then engage the gear 32 for the next quarter turn of the shaft 80.

It is desirable in a mechanism of this type and particularly in the control of the lower denomination input which may be disturbed quite easily, to have the disengagement of one side gear and the engagement of the other take place in a very short period of time, and to cause the intervals between changes to be spaced as accurately as possible. To space the changes as accurately as possible each of the cam groups 81 to 84 is caused to include a further cam. In the group 83 this additional cam is designated 86. This cam is free to rotate on the shaft 80 to a limited degree. It is driven by a pin 92 which is affixed to the cam 85. Cam 86 has a hole 93 formed in it into which the pin 92 extends freely with capacity for a considerable amount of lost motion.

The cam 86 is somewhat larger than the cam 85 but is otherwise generally similar to it in construction. It comprises two discs unitary with one another and each having high and low sectors arranged in alternation, with each sector covering approximately a quadrant. Because of the lost motion provided by the hole 93 and because a spring 86a bears against cam 86 to act as a brake, the cam 86 lags behind the cam 85. The cam arms 71 are provided with pointed projections 94 and 95 which are adapted to ride on the surfaces of the lobes 96 and 97 of the cam 86. These projections prevent the cam follower from rocking while the lobes of the cam 86 engage the projections, but when the cam 86 has been rotated to a point to bring a lobe end beneath a projection, the projection can drop to the lower level of the cam, permitting the follower to rock.

As shown in the drawing, Figure 2, the spring arm 88 has been moved to the right by the lobe 90, which has been rotated in the direction of the arrow. In the position shown, lobe 96 is holding the projection 94 and preventing the cam follower from rocking to the right. A small amount of further rotation of the cam 86 in a clockwise direction will cause projection 94 to drop to the lower surface of the cam 86 and permit the spring 40 to move the cam follower 63 and the arms 72 and 73 quickly to the right.

Even though shaft 80 be turned very slowly, as soon as projection 94 reaches the end of the lobe 96, the spring arm 88 will cause projection 94 to descend the sloping surface of the lobe until the spring arms 87 and 88 are in balance. Since the cam 86 is free to turn ahead of the driving pin 92, the adjustment will cause the driving pin 92 to be substantially centered relative to the opening 93.

Ninety degrees further rotation of the shaft 80 will cause the spring arm 88 to reach the end of the lobe 90 and release the tension of the arm 88. At this point a lobe 89 will have reached engagement with the spring arm 87, tending to rock the follower 71 to the left, and now engaging projection 95 with lobe 97. The engagement of the projection 95 with the lobe 97 will prevent the cam follower being rocked to the left until the point of the projection 95 clears the concentric surface of lobe 97, at which point the cam follower and its arms will rock back to the left.

It will be noted that the exact timing of the rocking action will be controlled by the spacing of the lobes on the cam 86, and since these can be accurately machined, exact timing is assured.

When the shaft 80 is rotated in the reverse direction (clockwise as viewed in Figure 2), the action will be the same in principle as that which has been described. Although the cam 86 will lag relative to the cam 85, the desired rocking will occur at the end of a quadrant and at that time the hole 93 will again be centered relative to the pin 92.

In Figure 2 the cam 85 has been shown with two each of the lobes 89 and 90 and the cam 86 has been shown with two each of the lobes 96 and 97. This is because the cams associated with the differential gear 23 has been selected for illustration. In point of fact, however, the cams differ from one another in accordance with the denominations with which they are used.

Cams 85a and 86a, shown in Figure 8, are used in conjunction with differential gear 31 of the lowest denomination. These cams are required to shift the associated cam follower 61 after each one-sixteenth revolution of the shaft 80. The cam 85a is accordingly provided with eight lobes 89a and eight lobes 90a, each extending through substantially one-sixteenth of the circumference. The cam 86a is similarly provided with eight lobes 96a and eight lobes 97a, each extending through substantially one-sixteenth of its circumference.

Cam 86b shown in Figure 9, is like cam 86, but is provided with four lobes 89b and four lobes 90b, each extending through substantially one-eighth of the circumference. Cam 85b (Fig. 1) is similarly provided with eight lobes. These cams are required to shift the associated cam follower 62 after each one-eighth revolution of the shaft 80.

Cam 86c, shown in Figure 11, is like cam 86, but is provided with one lobe 96a and one lobe 97a, each extending through substantially one-half of the circumference. Cam 85c is similarly provided with two lobes. These cams are required to shift the associated cam follower 64 after each half revolution of the shaft 80.

When more than four each of the summing and driving differentials are used (as in the illustrative example), the additional differentials are added onto the shafts 10 and 40, but since it is not practicable to divide a revolution of the shaft 80 into more than sixteen equal operative parts, the shaft 80 can accommodate the cams for only the four differential sets of lowest denominations.

For an additional series of differentials another shaft 100 is provided in axial alignment with the shaft 80. The shaft 100 is arranged to be driven by intermittent gearing from the shaft 80. Such gearing comprises a disc 101. A segment 102, comprising two teeth and an intervening tooth space, is affixed to the disc 101. The disc 101 is formed with a single notch 103 in register with the tooth space of the segment 102. An eight toothed pinion 104 having alternate long teeth 105 and short teeth 106 is positioned to be engaged by the segment 102 and is rotated 90°, or two teeth for each complete rotation of the shaft 80. The long teeth normally engage the periphery of the disc 101 to lock the pinion 104 against rotation, but as the leading tooth of the segment 102 comes into engagement with one of the short teeth, of the pinion, the notch 103 comes opposite the long tooth of the pinion which is required to enter the disc and permits the pinion to be turned through two tooth spaces. At that point the segment 102 moves clear of the pinion and the pinion is relocked. All the teeth of the pinion 104 are engageable with the teeth of the thirty-two toothed gear 107 which is fast upon the shaft 100. A two-tooth turn of the pinion 104, therefore, turns the shaft 100 through one-sixteenth revolution. Through the last one-sixteenth of each forward revolution of the shaft 80, therefore, the shaft 100 is caused to turn in unison with the shaft 80. The shaft 100 is then locked against rotation for the ensuing fifteen-sixteenths revolution of the shaft 80.

The gear 101, fast on the shaft 80, includes a hub portion which is rotatively supported in a stationary bearing bracket 101a. The bracket 101a supports a stub shaft 101b upon which the pinion 104 is mounted. The left end of shaft 80 is recessed to provide bearing for a reduced extension 100a of shaft 100.

The shaft 100 has fast upon it four cams 111, 112, 113 and 114, which control cam followers 65, 66, 67 and 68, respectively. The intermittent gearing compels extra space to be left between the cam group 84 and the cam 101, and this compels a corresponding spacing of the followers 64 and 65 and the differential gears with which these followers are associated. As stated above, on the shaft 60 the spacer sleeve 68a is interposed between the hub portions 69 of the followers 64 and 65. On the shaft 10 collars 116 are provided at opposite sides of the differentials 21 to 24 and at opposite sides of the differentials 25 to 28 for confining the terminal side gears 32 and 33 to their assigned positions. On the shaft 40 the planet gear carrier of differential gear 44 is not connected to the side gear 50 of differential gear 45, but is connected to a spacing and drive transmitting sleeve 117. The sleeve 117 is keyed to the hub of side gear 50 of differential 45.

The second section of the ratio selector or multiplicand setter is similar in principle to the first section, but of somewhat simpler construction. The cam follower 67 of Figure 3 is typical of the cam followers 65 to 68. The cam follower 67 comprises a rigid U-shaped body portion 118 which is formed with inward projections 119 and 120 on its axially offset arms 121 and 122. The arms 121 and 122 have affixed to them stiff but resilient arm extensions 123 and 124 which are formed with inturned hooks 125 and 126 at their free ends for engaging the teeth of the respective gears 33 and 32 of the associated differential gear 27.

The cam 113 comprises two discs which are unitary with one another. One of the discs is formed with two high sectors or lobes 125 and two low sectors, each sector extending through substantially a quadrant. The other disc is formed with two high sectors or lobes 126 and two low sectors, each sector extending through substantially a quadrant. The disc which includes the lobes 125 is constantly engaged with the follower projection 119 and the disc which includes the lobes 126 is constantly engaged with the follower projection 120. The angular relation of the lobes is such that just as the follower projection 120 rides off a lobe of one disc the follower projection 119 rides onto a lobe of the other disc and vice versa.

The cams 111, 112 and 114 are similar in principle to the cam 113, but differ in the number and extent of the lobes provided. The cam 111 of Figure 12 includes eight lobes 125a and eight lobes 126a, each of which extends through approximately one-sixteenth of the circumference. The follower 65 is therefore operated in one direction or the other for each sixteenth revolution of the shaft 100. The cam 112 of Figure 13 includes four lobes 125b and four lobes 126b, each of which extends through approximately one-eighth of the circumference. The rocker 66 is therefore operated in one direction or the other for each one-eighth revolution of the shaft 100. The cam 114 of Figure 15 includes one lobe 125b and one lobe 126b, each of which extends through approximately one-half of the circumference. The follower 68 is, therefore, operated in one direction or the other at each half revolution of the shaft 100.

In the described mechanism, differential gears employing side gears with interposed transverse planet gears are utilized, this type of construction being a simple one and having the advantage that a binary system of inputs can be provided in a single bank or train of the gears. The primary novelty resides in the construction and principle of operation of the cams employed in the first section of the ratio selector where the low resistance of the output train to operation by the low denomination gearing makes it important that one side gear of an input differential be locked the instant that the other side gear of that differential is unlocked. With locking mechanism of the kind disclosed, this result is assured.

I have described what I believe to be the best embodiment of my invention. I do not wish, however, to be confined to the embodiment shown, but what I desire to cover by Letters Patent is set forth in the appended claims.

What is claimed is:

1. In a variable speed transmission mechanism, the combination with an input member, an output member, and denominational transmission mechanism between said members, including in each denomination a summing differential and an input differential therefor, the summing differentials serving to receive and combine the inputs from such of the input differentials as may be active, and each input differential comprising an input planet gear carrier driven from the input member and alternatively lockable parallel transmission and waste gears which include circumferential teeth, so that any input differential can be rendered active or inactive as desired, a ratio selector comprising a cam shaft, and for each of several denominations, a two disc cam fast on the cam shaft, a U-shaped cam follower, means rockably supporting the cam follower, axially offset projections on the follower engageable with the respective discs of the cam at opposite sides of the cam shaft, and axially offset hooks carried by the follower for engagement respectively with the circumferential teeth of the transmission and waste gears of the associated input differential, and movable alternatively toward and from gear engagement.

2. In a variable speed transmission mechanism, the combination with an input member, an output member, and denominational transmission mechanism between said members, including in each denomination a summing differential and an input differential therefor, the summing differentials serving to receive and combine the inputs for such of the input differentials as may be active and each input differential comprising an input planet gear carrier driven from the input member and alternatively lockable parallel transmission and waste gears which include circumferential teeth, so that any input differential can be rendered active or inactive as desired, a ratio selector comprising a cam shaft, and for each of several lower denominations, a first cam fast on the cam shaft, a second cam loose on the cam shaft, means forming a lost motion driving connection from the first to the second of said cams, a U-shaped cam follower, means rockably supporting the cam follower, opposed spring arms carried by the follower, and engageable with the fixed cam at opposite sides of the cam shaft, projections on the follower engageable with the loose cam at opposite sides of the cam shaft, and hooks carried by the follower for engagement respectively with the circumferential teeth of the transmission and waste gears of the associated input differential, and movable alternatively toward and from gear engagement, the construction and arrangement in each instance being such that the spring arms, responsive to the cam which is fixed on the cam shaft, are first put under follower shifting bias by the fixed cam and the lagging, loose cam, in engagement with the follower arm projections, is then carried on into position to permit such bias to take effect, shifting the follower by snap action out of engagement with one gear of the associated differential and into engagement with the other, the timing of the shift being controlled by the loose cam.

3. In a variable speed transmission mechanism, the combination with an input member, an output member, and denominational transmission mechanism between said members, including in each denomination a summing differential and an input differential therefor, the summing differentials serving to receive and combine the input from such of the input differentials as may be active, and each input differential comprising an input planet gear carrier driven from the input member and alternatively lockable parallel transmission and waste gears which include circumferential teeth, so that any input differential can be active or inactive as desired, a ratio selector comprising a cam shaft, and for each of several lower denominations, a first two disc cam fast on the cam shaft, a second two disc cam loose on the cam shaft, means forming a lost motion driving connection from the first to the second of said cams, a U-shaped cam follower, means rockably supporting the cam follower, opposed spring arms carried by the follower, and engageable with the respective discs of the fixed cam at opposite sides of the cam shaft, projections on the follower engageable with the respective discs of the loose cam at opposite sides of the cam shaft, and hooks carried by the follower for engagement respectively with the circumferential teeth of the transmission and waste gears of the associated input differential, and movable alternatively toward and from gear engagement, the construction and arrangement in each instance being such that the spring arms, responsive to the cam which is fixed on the cam shaft, are first put under follower shifting bias by the fixed cam and the lagging, loose cam, in engagement with the follower arm projections, is then carried on into position to permit such bias to take effect, shifting the follower by snap action out of engagement with one gear of the associated differential and into engagement with the other, the timing of the shift being controlled by the loose cam.

4. In a variable speed transmission mechanism, the combination with an input member, an output member, and binary transmission mechanism between said members, including summing differentials connected in series to the output member and input differentials connected in parallel between the input member and the respective summing differentials, each input differential comprising an input planet gear carrier driven from the input member and parallel transmission and waste gears which include circumferential teeth, a ratio selector comprising a cam shaft, and for each of several lower denominations, a first two disc cam fast on the cam shaft, a second two disc cam loose on the cam shaft, means forming a lost motion driving connection from the first to the second of said cams, a U-shaped cam follower, means rockably supporting the cam follower, opposed, axially offset spring arms carried by the follower, and engageable with the respective discs of the fixed cam at opposite sides of the cam shaft, axially offset projections on the follower engageable with the respective discs of the loose cam at opposite sides of the cam shaft, and axially offset hooks carried by the respective follower arms for engagement respectively with the circumferential teeth of the transmission and waste gears of the associated input differential, and movable alternatively toward and from gear engagement, the construction and arrangement in each instance being such that the spring arms, responsive to the cam which is fixed on the cam shaft, are first put under follower shifting bias by the fixed cam and the lagging, loose cam, in engagement with the follower arm projections, is then carried on into position to permit such bias to take effect, shifting the follower by snap action out of engagement with one gear of the associated differential and into engagement with the other, the timing of the shift being controlled by the loose cam.

5. In a variable speed transmission mechanism, the combination with an input member, and output member, and denominational transmission mechanism between said members, including in each denomination a summing differential and an input differential therefor, the summing differentials serving to receive and combine the inputs from such of the input differentials as may be active, and each input differential comprising an input planet gear carrier driven from the input member and alternatively lockable parallel transmission and waste gears which include circumferential teeth, so that any input differential can be rendered active or inactive as desired, a ratio selector comprising a cam shaft, and for each of several lower denominations, a first two disc cam fast on the cam shaft, a second two disc cam loose on the cam shaft, means forming a lost motion driving connection from the first to the second of said cams, a U-shaped cam follower, means rockably supporting the cam follower, axially offset opposed spring arms carried by the follower, and engageable with the respective discs of the fixed cam at opposite sides of the cam shaft, axially offset projections on the follower engageable with the respective discs of the loose cam at opposite sides of the cam shaft, the discs of each cam having lobes and intervening gaps of substantially equal angular extent arranged in alternation, and axially offset hooks carried by the follower for engagement resepctively with the circumferential teeth of the transmission and waste gears of the associated input differential, and movable alternatively toward and from gear engagement, the construction and arrangement in each instance being such that the spring arms, responsive to the cam which is fixed on the cam shaft, are first put under follower shifting bias by the fixed cam and the lagging, loose cam, in engagement with the follower arm projections, is then carried on into position to permit such bias to take effect, shifting the follower by snap action out of engagement with one gear of the associated differential and into engagement with the other, the timing of the shift being controlled by the loose cam.

6. In a variable speed transmission mechanism, having an input member, an output member, and denominational transmission mechanism between said members, including in each denomination a summing differential and an input differential therefor, the summing differentials serving to receive and combine the inputs from such of the input differentials as may be active, and each input differential comprising an input planet gear carrier driven from the input member and alternatively lockable parallel transmission and waste gears which include circumferential teeth, so that any input differential can be rendered active or inactive as desired, a novel ratio selector comprising a cam shaft, and for each of several lower denominations, a first two disc cam fast on the cam shaft, a second two disc cam loose on the cam shaft, means forming a lost motion driving connection from the first to the second of said cams, a U-shaped cam follower, means rockably supporting the cam follower, opposed, axially offset spring arms carried by the follower, and engageable with the respective discs of the fixed cam at opposite sides of the cam shaft, axially offset projections on the follower engageable with the respective discs of the loose cam at opposite sides of the cam shaft, each cam disc having lobes and gaps of substantially equal angular extent arranged in alternation, and axially offset hooks carried by the follower for engagement respectively with the circumferential teeth of the transmission and waste gears of the associated input differential, and movable alternatively toward and from gear engagement, the construction and arrangement in each instance being such that the spring arms, responsive to the cam which is fixed on the cam shaft, are first put under follower shifting bias by the fixed cam and the lagging, loose cam, in engagement with the follower arm projections, is then carried on into position to permit such bias to take effect, shifting the follower by snap action out of engagement with one gear of the associated differential and into engagement with the other, the timing of the shift being controlled by the loose cam.

7. A structure as set forth in claim 6 in which the high and low cam surfaces of the loose cam are connected through sloping surfaces which, under spring impulsion, cause the lagging of the loose cam to be substantially eliminated as the shifting of the follower is effected.

References Cited in the file of this patent
UNITED STATES PATENTS

| | | |
|---|---|---|
| 417,840 | Ross | Dec. 24, 1889 |
| 1,460,958 | Gahlert | July 3, 1923 |
| 2,177,611 | McLaren | Oct. 24, 1939 |
| 2,322,767 | McLaren | June 29, 1943 |